INVENTORS
WOLFGANG DIETRICH
HELMUT P. LOUIS
WALTER E. PROEBSTER
BY [signature]
ATTORNEY June 21, 1966 W. DIETRICH ETAL 3,257,649

MAGNETIC STORAGE STRUCTURE

Filed Aug. 17, 1962 3 Sheets-Sheet 3

3,257,649

MAGNETIC STORAGE STRUCTURE

Wolfgang Dietrich, Croton, Helmut P. Louis, Briarcliff Manor, and Walter E. Proebster, Chappaqua, N.Y., assignors to International Business Machines Corporation, New York, N.Y., a corporation of New York Filed Aug. 17, 1962, Ser. No. 217,768
Claims priority, application Switzerland, Oct. 28, 1961, 12,440/61
14 Claims. (Cl. 340—174)

This invention relates to magnetic thin film memories and, more particularly, to a magnetic thin film memory structure employing a metallic ground plate and an intermediate conductive carrier substrate member to insure proper orientation of drive fields to the elements and thereby allow construction of large capacity memory arrays.

Different arrangements for thin magnetic film memories have been proposed. (Proceedings of the IRE, vol. 49, No. 1, January 1961, pages 118–120 and 155–164.) Due to technical difficulties, such memories have been constructed to provide a very small storage capacity relative to ferrite core memories. Technical difficulties in construction of the film memories have been encountered in both process and fabrication. For example, to provide a large capacity memory, a correspondingly large substrate member is required for supporting a large number of memory cells. Such a memory has sought to be constructed by first laying down a continuous layer of magnetic metallic material over the entire surface of the substrate and then photo-etching the magnetic material to provide individual memory cells. This technique suffers the disadvantage that the homogeneity of the individual memory cells is not constant with respect to thickness, a prerequisite for proper overall memory operation. Alternately, the individual cells may be provided for the memory by depositing the magnetic material on the substrate through a mask. This latter technique requires several vaporization sources or one source removed from the substrate by a considerable distance. In such a process, a very high vacuum must be employed, and an orienting magnetic field. If many evaporation sources are to be employed or one source greatly removed from the substrate, a large vacuum chamber is required, greatly increasing fabrication costs. Further, the orienting magnetic field employed in the different processes must produce, for each memory location, a uniaxial anisotropy defining an easy axis of magnetization. The easy axis for each element must be parallel to all the other elements of the array and the larger the array constructed, the greater the dispersion of the easy axis of the different memory locations while the anisotropy constant measured also varies due to the difficulty of maintaining a constant orienting field intensity along greater distances.

A seemingly straightforward solution to the apparent delerium is to fabricate a desired large capacity thin film memory by employing either of two methods. The first method would be to justify the cost of employing a large vacuum chamber and depositing the memory cells onto a conductive substrate member either by utilizing a plurality of evaporation sources or a single source substantially removed from the mask and substrate member, while controlling the orienting magnetic field to a high degree to provide a constant field along the surface of the substrate during deposition. Assuming that such a fabrication step were successful, in order to construct a workable memory, a plurality of coodinately arranged strip-line conductor would then have to be deposited over the surface of the memory plane intermediate layers of insulating material. The conductors would then have one end connected to the conductive substrate member so as to employ this substrate member as a ground plane. If the initial fabrication of the large plane of memory cells were successful, although costly, operation of the memory sufficient to provide minimum noise on the output circuit meets with even more difficulty. The additional noise signal encountered may be traced to the inability of providing a perfect low ohmic connection of the conductors to the substrate at every point along the width of each strip-line. Since the current in a strip-line will seek a path of least resistance, if one side of the strip-line has a comparatively large ohmic connection, then the current will flow through the other side of the strip-line, providing, in the return current path, a deviation from the desired current path linking the memory cells and, hence, a deviated magnetic field. To insure a low ohmic connection for each strip-line conductor with the substrate would require a highly refined technique, again materially adding to the fabrication costs.

A second method might be to provide a multiplicity of small memory planes, each plane having a matrix of thin film memory cells, placing the planes in desired alignment, providing conductors for controlling the memory cells and winding these conductors about the different memory planes in strip-line-shaped arrangement. Due to the extreme difficulty of aggregating a multiplicity of small memory planes, stabilizing the planes while winding the necessary conductors and still maintaining the same relationship of each conductor with each memory cell of each plane, this method is also unsatisfactory.

A large capacity, low cost, thin film memory is constructed by following the teachings of this invention. A plurality of current conductive carrier substrates are provided each having a like matrix of planar uniaxial anisotropic magnetic thin film memory cells deposited thereon with each memory cell having its easy axis in alignment with each other memory cell. The carrier substrates are affixed to an insulated surface of a planar, current conductive, support substrate member. A plurality of strip-line conductors are coordinately arranged over each carrier substrate, intermediate layers of insulating material, and one end of each strip-line conductor is ohmically connected to the support substrate member. The function of the support substrate member is to provide support for all the carrier substrates, and to also act as a ground plane. Since, as pointed out previously, perfect low ohmic connection at every point along the width of each strip-line to the support substrate is required but is difficult to achieve, it is the function of the carrier substrates to introduce a relatively large impedance in each conductive line, when energized, so that the deviation in ohmic resistance at the connection of the strip-line with the support substrate becomes negligible and there will be no deviation of the current through the conductor insuring minimum induced noise on the output conductor. The carrier substrates introduce a relatively large impedance with respect to the ohmic connection of the conductive strip-lines, since when energized, the conductive carrier substrates provide capacitive coupling between the conductor and the support substrate.

Accordingly, it is a prime object of this invention to provide an improved magnetic thin film memory structure allowing high capacity storage.

A further object of this invention is to provide an improved magnetic thin film memory structure amenable to high capacity storage with high speed memory cycles.

Still a further object of this invention is to provide a high capacity magnetic thin film memory amenable to low fabrication costs.

The foregoing and other objects, features and advantages of the invention will be apparent from the following more particular description of preferred embodiments of the invention, as illustrated in the accompanying drawings.

Figure 6:
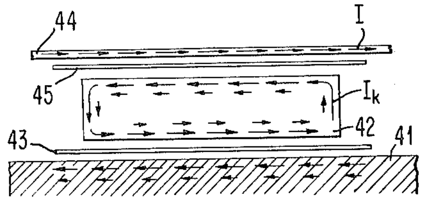

FIGS. *5a/b/c* show pulse shapes as they appear within the strip-line-shaped current conductors during operation of the thin magnetic film memory;

FIG. 6 shows the current distribution in a carrier substrate which is insulated from the ground plate, as it occurs during pulse operated activation;

FIGS. *7a/b* show the arrangement of current conductors and current return ground plate without (*a*) and with (*b*) an intermediate metallic carrier substrate, which arrangement is of influence with respect to the impedance of a stripline-shaped current conductor.

Figure 1:
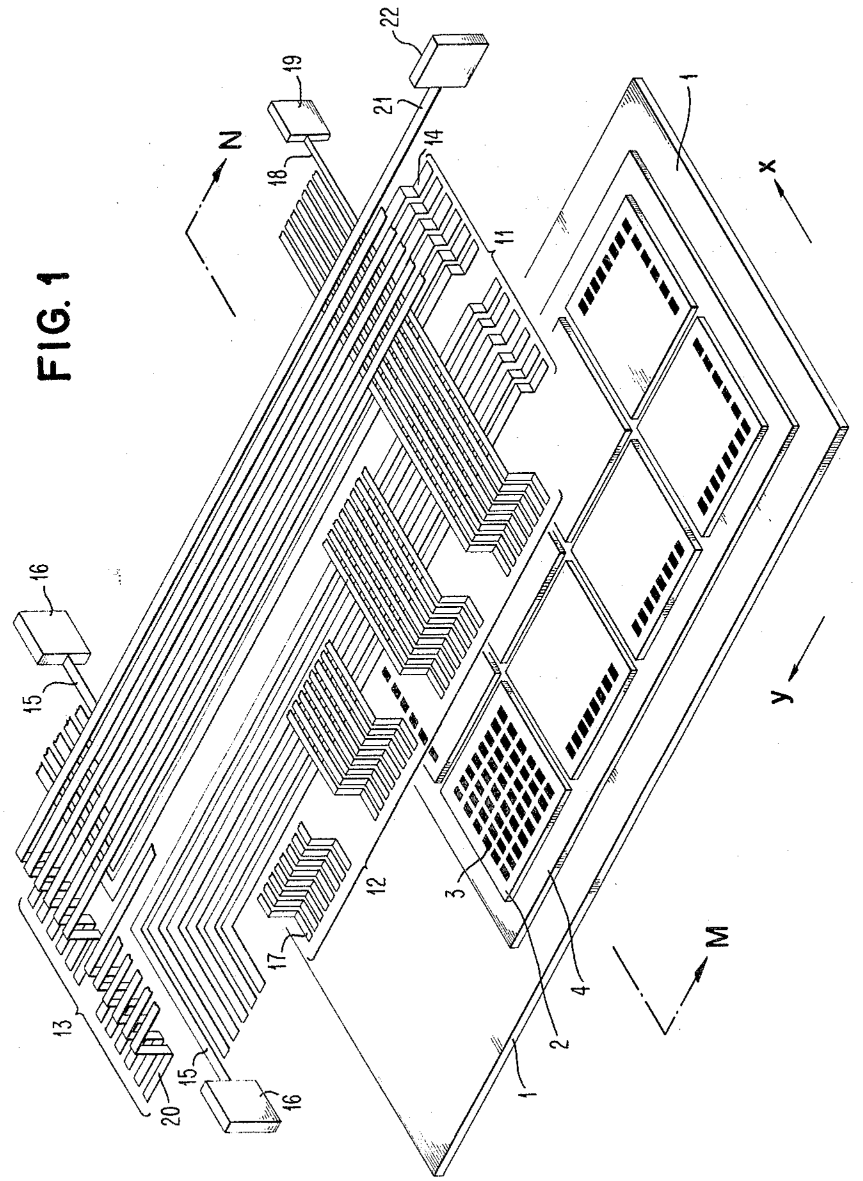
FIG. 1 shows an embodiment of the storage arrangement in exploded view.

An embodiment of the storage arrangement in explosive view is shown in FIG. 1. On a metallic ground plate 1 are fixed several (in the drawing exemplified for instance, by eight) metallic carrier substrates 2 on which are placed the storage cells 3. The carrier substrates can be placed onto the ground plate 1 either directly or separated by an insulating intermediate layer 4. In the storage arrangement the ground plate serves as common return conductor for all the stripline-shaped current conductors placed above, the arrangement of which will be described later. The insulating layer 4 which can be provided between the ground plate 1 and the carrier substrates 2, may consist of a thin foil of plastic material (of approximately 5 $\mu$m thickness), or carrier substrates may be used having on their bottom sides evaporated or sputtered with insulating layers of silicium oxide or plastic resin (of approximately, 1 $\mu$m. thickness). An electrically good conducting material, such as copper or silver, is chosen as the metallic material for ground plate and carrier substrates. The thickness of the substrate is approximately 2 mm. An electrical insulation between ground plate and carrier substrates does not influence the function of the memory as pulses with high repetition frequencies (approximately 5 mc./s. and more) are applied for its actuation and the capacitive coupling between ground plate and substrates for these high frequencies naturally is very good. For constructive reasons it is very advantageous to provide an insulating intermediate layer. When no insulation is provided, difficulties arise in the establishment of an immaculate galvanic connection between the ground plate and the carrier substrates. Perfect galvanic connection has proved to be essential for disturbance-free current conduction in the substrates. A mere piling up and pressing together of the plates does not solve this problem as it is not possible to manufacture perfectly plane plates as would be required. Even the tiniest convexities result in a disproportionate piling up of the plates and thus cause pernicious disturbances in the current return path which disturbances have proved to impair the proper functioning of the memory. The possibility of a proper galvanic connection of the carrier substrates on all the sides along their circumference with the ground plate, by soldering for instance has been contemplated, but has proved impractical from a manufacturing point of view, and such a connection prevents later adjustment or exchanging of individual substrates, which may become necessary thus requiring scraping of the whole unit. The electrical problems of the capacitive coupling between the ground plate and the carrier substrates when an insulating intermediate layer 4 is provided will be discussed subsequently in detail with reference to the FIG. 6.

The storage cells 3 which are placed on the substrates 2 consist of a thin magnetic layer and exhibit a uniaxial magnetic anisotropy. The preferred or "easy" direction for the magnetization runs parallel to the direction of the *x*-coordinates. The orthogonal direction thereto is the "hard" direction, and runs parallel to the direction of the *y*-coordinates. The thin magnetic film storage cells 3 may be produced according to any one of several known methods in the art. The magnetic layer of cells 3 may be produced, for instance, by vacuum evaporation, by cathode atomization, by chemical precipitation or by electrolytical deposition. The storage cells themselves can be produced by covering the remaining parts of the carrier with a respective mask when the magnetic layer is applied; another method remains in that the other parts of the magnetic layer afterwards are removed by a photoetching process. All these methods are known to people skilled in the art and, therefore, need not be explained further. Also known is that a uniaxial magnetic anisotropy of the storage cells can be produced whenever the thin magnetic film is applied in presence of a magnetic field. The magnetic material of which the cells are made generally of a nickel-iron alloy (for instance, permalloy of the composition 80% Ni and 20% Fe). The cells may be deposited directly onto the metallic substrate 2 or may be deposited onto a thin intermediate layer of insulating material, such as silicon (cf. 5 in FIG. 2). The insulating layer can also be provided by a vaporization process. In the embodiment shown in FIG. 1, the storage cells 3 are of practically rectangular shape with the easy axis of each cell being parallel to the longitudinal axis of the cells. In a practical embodiment each cell 3 may have a length of approximately 0.6–0.7 mm.; a width of approximately 0.3 mm.; and a thickness of approximately 500 A. (1 A.$=10^{-8}$ cm.); with the distance between each cell 3 in the *x*-direction being between 0.4–0.5 mm.; and the distance between each cell 3 in the *y*-direction being approximately 0.3 mm. If each carrier substrate 2 has a dimension of approximately 5 x 5 cm., 36 storage cells may be placed in the *x*-direction, and 64 cells in the *y*-direction, providing a capacity of 2304 single cells ("bits") for each carrier substrate 2. If, in the entire storage arrangement, eight carrier substrates are used, as shown for instance in FIG. 1, then the magnetic film memory has a storage capacity of 256 words with each word consisting of 72 binary digits each. (Under this assumption one word consists of the $2\times36=72$ bits which are arranged in a straight line parallel to the *x*-direction.)

Figure 2:
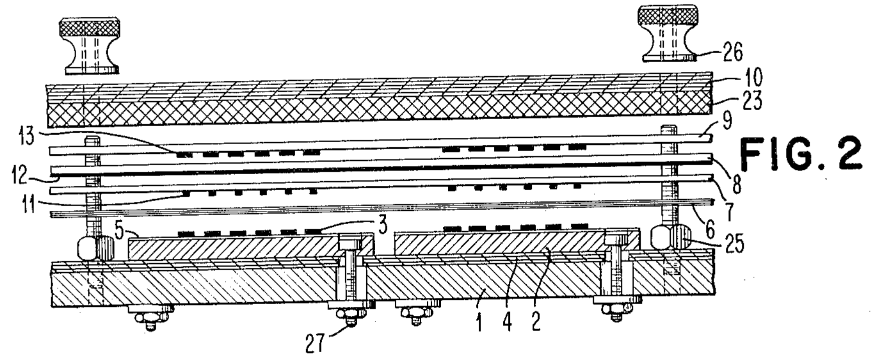
FIG. 2 shows a cut M–N through the storage arrangement of FIG. 1.
Figure 3:
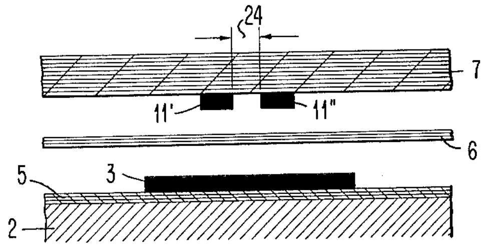
FIG. 3 shows a cut through a strip-line-shaped current conductor.

On top of the thin magnetic film cells are placed three layers of stripline-shaped current conductors 11, 12 and 13, which are schematically shown in FIG. 1. In order to obtain a clearer picture, the necessary insulating intermediate layers have been omitted in the exploded view. A cut M–N through the storage arrangement is shown in FIG. 2 and is provided with the respective numerals. On top of the thin magnetic film cells there is deposited a thin insulating layer 6 having a thickness of approximately 1–5 $\mu$m. which may be an evaporated silicon layer or a layed-on-foil. The insulating layer 6 may be dispensed with when the intermediate insulating layer 5 is provided between the cells and the substrate as set forth above. In either case, the first layer of stripline-shaped current conductors 11 are then positioned over the storage cells 3 to run parallel in the *y*-direction. The arrangement is made such that a stripline 11 is provided for each row of thin magnetic film cells. Each stripline 11 has one end 14 directly connected to ground plate 1 and the other end 15 connected to an amplifier 16. The striplines 11 are employed to inductively sense the magnetic flux changes which occur when the thin magnetic film cells 3 are activated. The striplines 11 are therefore called "sense-lines." The voltages induced on sense lines 11 are amplified by the amplifiers 16 which are referred to as "sense amplifiers." The sense lines 11 are positioned on the bottom side of an insulating foil 7 (approximate thickness 40 μm.). A suitable tissue of glass fibres is used as the insulating foil 7 which is glued to the material employed for the sense lines by means of a plastic resin. Copper pasted glass fibre insulating foils are available on the market. The desired pattern of the stripline-shaped sense lines is then produced by a photoetching process. In order to avoid detrimental eddy current influences when the thin magnetic film cells are switched, it is of advantage to apply slotted stripline-shaped current conductors, that is in the practical embodiment, a current conductor consists of several narrow copper strips which run parallel to each other. This is schematically shown in FIG. 3 for a sense line 11, whereby this latter is slotted once and such consists of two copper strips 11' and 11''. A slot 24 is defined between the copper strips 11' and 11'' and is kept as small as possible. By photoetching, slot widths of approximately 50 μm. and less may be achieved, and in practice the width of the individual copper strips 11' and 11'' may be in this order of magnitude, i.e., 2 x 50 μm. With the sense line 11 slotted, only part of the thin magnetic film cells is covered; however, this has not proved to be of disadvantage.

A second layer of stripline-shaped current conductors 12 is then provided which run parallel to the *x*-direction. The conductors 12 may also consist of copper, for instance. The arrangement again is such that a stripline conductor 12 is provided for each row of thin magnetic film cells. Each stripline 12 has one end 17 connected directly to the ground plate 1 while the other end 18 is connected to an amplifier 19. The striplines 12 are provided to activate the storage cells 3, and are supplied with current pulses by means of amplifiers 19, whereby a magnetic field is produced which is applied to the cells 3 and is directed parallel to the hard direction. Whenever a certain current conductor 12 is activated; the storage cells belonging to one "word" are selected and these conductors 12 therefore are also designated "word lines." Similarly, as is the case with the sense lines, the word lines 12 are also placed on the bottom side of an insulating foil 8 (approximate thickness 40 μm.). The desired conductor pattern again is produced by photoetching a copper pasted glass fiber insulating foil. The word lines also are slotted and in this case primarily for the reason that the magnetic field, which is produced by the third layer of current conductors 13 placed on top, has better chances to penetrate. For instance, for a word line 12 there can be provided three slots of 50 μm. width each and four parallel copper strips of 50 μm. width forming the word line altogether. The total width such is 350 μm.=0.35 mm. so that the word line 12 covers the entire thin magnetic film cell.

Next follows the third layer of stripline-shaped current conductors 13 which run parallel to the *y*-direction. Again a conductor is provided for each row of thin magnetic film cells. Each stripline 13 has one end 20 directly connected to the ground plate 1 and its other end 21 connected to an amplifier 22. Binary information is written into the storage cells by use of the striplines 13 for which purpose amplifiers 22 supply current pulses of suitable polarity whereby a magnetic field is produced which is applied to the storage cells 3 and which, according to the current polarity, acts either in the one direction or in the direction opposite thereto parallel to the easy direction. Whenever a certain current conductor 13 is activated, the associated storage cell 3 representing a certain binary digit ("bit") in a word is selected, and therefore the conductors 13 are designated "bit lines." As is the case with the sense and word lines, the bit lines 13 are also on the bottom side of an insulating foil 9 (approximate thickness 40 μm.). The desired conductor pattern again is produced by photoetching a copper pasted glass fibre insulating foil. The bit conductors also are slotted in order to avoid detrimental eddy currents when the thin magnetic film cells are switched. For each bit line 13, there may be provided, for instance, six slots each being 50 μm. wide and seven parallel copper strips of 50 μm. width forming the bit line altogether. The total width of each bit line is then 650 μm.=0.65 mm., thus the entire thin magnetic film cell is covered by the bit line. In principle it is possible to dispense with the third layer of current conductors 13 and to have the current conductors 11 (i.e., the sense lines) to function also as bit lines, in which case supplemental hardware in the periphery switching circuits would be required.

Topmost the storage arrangement is a covering plate 10 on the bottom of which is placed a crepe rubber intermediate layer 23. The covering plate serves to press together the three layers of current conductors with the carrier substrates 2 and the ground plate 1 so that a mechanically stable arrangement is provided. An additional stability can be achieved, for instance, by pasting together the three layers of insulating foils carrying the current conductors. In order to bolt the arrangement, imbedded screws 25 are provided in the ground plate 1 onto which are slipped the three layers of current conductors which are provided with the corresponding adjusting holes. The covering plate 10 is placed on top and all is screwed up by means of the screw nuts 26. The carrier substrates 2 are fixed to the ground plate 1 by means of insulated or at least insulated inserted fixing screws or pins 27. As a certain free space may be tolerated the carrier substrates can be adjusted relative to the current conductors.

Figure 4:
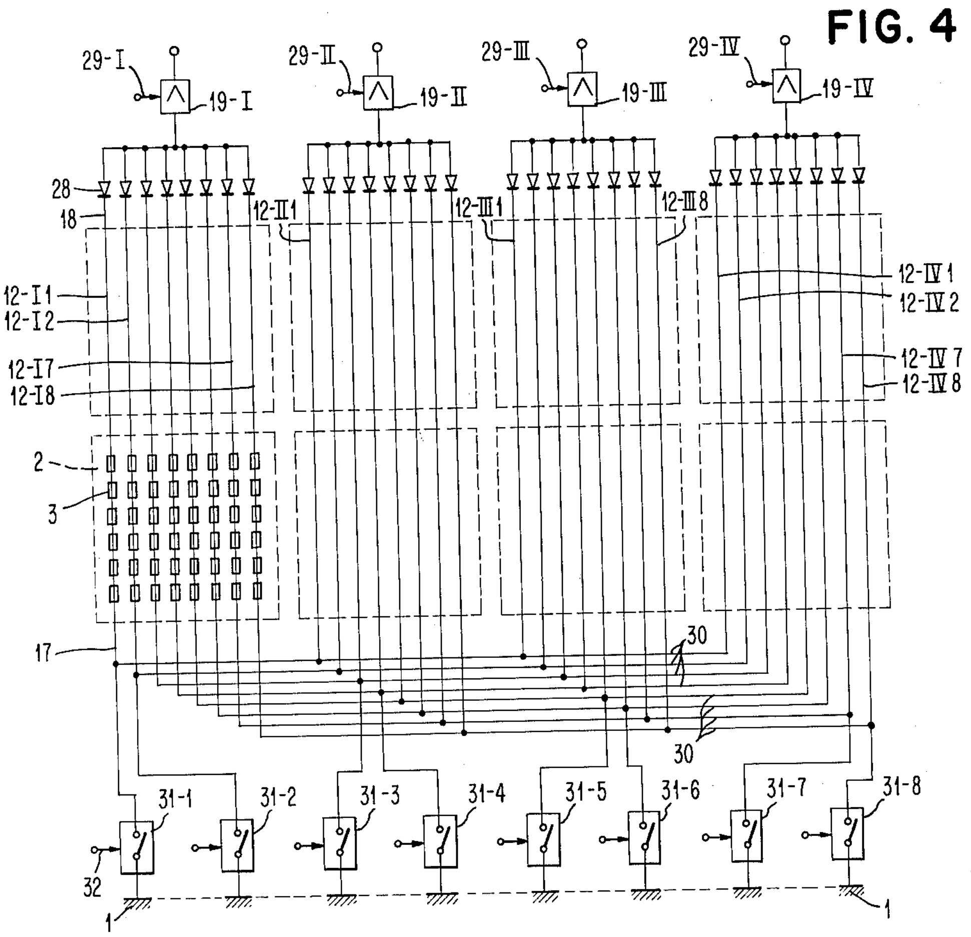
FIG. 4 shows the circuitry of the word lines as applied in a practical embodiment.

In practice, it is not customary, for the selection of a certain word line, to provide an amplifier for each word line as is assumed in FIG. 1. Instead, for the word lines there is used a circuit as shown in FIG. 4, which circuit demands only a minimal number of amplifiers. In this example, four groups of eight word lines 12 each are assumed. They are connected at the one end 18 with diodes 28. The other terminals of the diodes groupwise are connected mutually and also to four driving amplifiers 19I–IV by shortest possible wirings. These driving amplifiers are selectively controllable via corresponding conductors 29 according to the given address. The word lines with their other ends 17 are connected via a plurality of connecting conductors 30 ("bus") to eight gates 31–1 through 31–8 which, in a similar manner as the driving amplifiers, are selectively controllable via corresponding conductors 32 according to the given address. The gates 31 are made low ohmic, so that at the instant when a word line is selected, the respective end 17 is electrically connected as low ohmic as possible with the potential of the ground plate 1. The ends 17 of the word lines 12 are mutually connected by the connecting conductors 30 as follows: all first conductors of each group I–IV are connected to gates 31–1, all second conductors of each group I–IV are connected to gate 31–2, etc., and all eight conductors of each group I–IV are connected to gate 31–8. Owing to this circuit arrangement any time when a driving amplifier 19 and at the same time a gate 31 are activated, one and only one word line from the total amount of 4×8=32 word lines is selected and a current pulse is fed through. The example shown here with 4×8=32 word lines can be extended of course in a corresponding way on a much greater number of word lines, without any substantial change on the general principle applied.

In the following the operating method of the thin magnetic film memory is described and reference is made to FIGS. *5a/b/c*, where the pulse shapes occurring in the current conductors are shown. As already mentioned the binary information in the individual storage cells is represented by the position of the magnetization in the easy direction. The one state be designated 0 state, whereas the state opposite thereto be designated 1 state. Let us consider now a storage cell and assume that the magnetization first is in the 0 state. Whenever the word line which is allotted to this cell is applied with a driving current, a magnetic driving field acting in the hard direction is generated, which field, under the assumption that its amplitude is higher than the saturation field strength $H_K$ of the thin magnetic film, deflects the magnetization from the easy direction into the hard direction. Whenever this deflection or magnetization reversal takes place, a magnetic flux change occurs with reference to the allotted sense line and a voltage signal appears at the input of the sense amplifier which amplifies the signal in the manner desired. When the magnetic driving field is now made to disappear, i.e. when the driving current in the word line is switched off, the magnetization of the storage cell tends to reverse from the instable hard direction into a stable easy direction. If no special provisions have been made with respect to the direction of reversal, the magnetization of the storage cell splits, i.e. part of the magnetization switches into the 0 state and the other part reverses into the 1 state. In the split condition, the storage cell does not represent any defined information; the information previously stored in the cell under this supposition is therefore lost. In order to avoid this condition, information regeneration must be provided if it is desired to sense the information state of a storage cell without destroying the information contained therein. In a practical application, the procedure employed is to use the information contained in the readout signal to regenerate this information in the storage cell, and takes place in the middle of two sense pulses of the word line driving amplifiers. Also, in a practical embodiment a D.C. current of a certain polarity may be applied to the bit lines to provide a constant magnetic field component in the one easy direction (for instance, in direction of the 0 state) to insure that the magnetization of the storage cell entirely reverses into the thus predetermined easy direction (0 state) when the word line driving field is switched off. In such an embodiment, only when a "write 1" operation is desired does the polarity of the current have to be reversed in the bit line. This mode of operation is assumed for a pulse program shown in the FIGS. *5a/b/c* wherein the FIG. *5a* illustrates the current $i_B$ in the bit line; the FIG. *5b* illustrates the driving pulses $i_w$ in the word line; and the FIG. *5c* illustrates the voltage signals $u_L$ induced in the sense line. To begin with, it is assumed that the magnetization of the storage cell is in the 0 state. At a time $t_1$, the driving pulse $i_W$ (i.e. current in the word line) causes deflection of the magnetization into the hard direction while at the same time the positive half wave of the read signal $u_L$ is induced. Whenever the driving pulse $i_W$ is then switched off, the magnetization of the cell reverses into the 0 state due to the positive D.C. current $i_B$ flowing in the bit line; as a result of this switching action the negative half wave of the read signal $u_L$ is induced. The read signal $u_L$ shown at $t_1$ with a positive and a negative half wave is typical for a readout binary information 0. This signal can be integrated by the sense amplifier; at that time the voltage integral with respect to the sensing period equals zero. According to another mode of operation, the sense amplifier is gated by a trigger pulse in such a manner that it is only "open" at the instant when the positive half wave of the read signal occurs, i.e. acts amplifying, while it is "closed" at the instant when the negative half wave occurs, i.e. prevents the negative half wave from passing through. In this mode of operation only the positive signal is allowed to pass through the sense amplifier. For this purpose a non-linear or unipolar amplifier is particularly suitable.

Figures 5A, 5B, 5C:
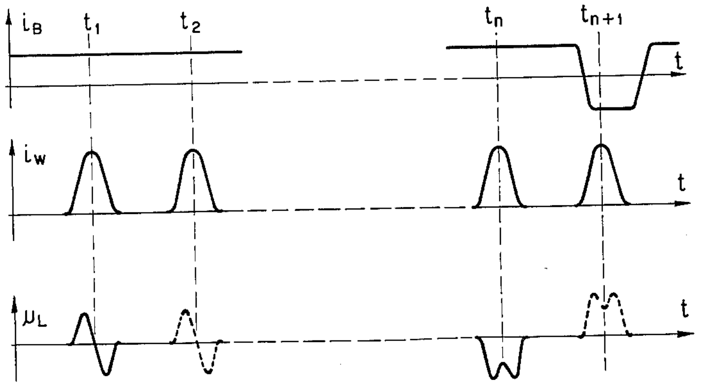

At a time $t_2$ operation of a "write 0" is described. This process, in principle, is the same as the just described process at instant $t_1$. At the end of this writing operation the magnetization of the storage cell is in the 0 state. When a 0 is written-in, the same wave shape is induced into the sense line as at instant $t_1$ when a 0 is readout. As this read signal is not further needed now, the sense amplifier can be "closed" and, therefore, this signal is shown in dotted lines in FIG. 5.

At a time $t_n$ operation of a "read 1" is described. It is assumed here that the magnetization of the storage cell is first in the 1 state. The driving pulse $i_W$ causes deflection of the magnetization of a storage cell into the hard direction, whereby a negative read signal $u_L$ is induced at the same time. The positive D.C. current $i_B$ flowing in the bit line causes reversal of the magnetization of the cell into the 0 state when the driving pulse $i_W$ is switched off, whereby again a negative voltage is induced. The negative read signal $u_L$ shown at $t_n$ is typical for a readout binary information 1. When this signal is integrated by the sense amplifier, the voltage integral for the sensing period is unequivocally negative (it does not equal zero now as this was the case previously when reading a 0). When, in a similar manner as shown above, the sense amplifier is "opened" by a gating pulse for the first half of the signal only, a negative signal will now pass through the amplifier. Thereby it can be seen that an unmistakable discrimination results for the operation "read 1" and "read 0," respectively.

At a time $t_{n+1}$ operation of a "write 1" is described. Before the 1 is written, the magnetization of the cell is assumed to be in the 0 state. It is caused to be deflected from the 0 position towards the hard direction by the driving pulse $i_W$ in the word line, whereby a positive voltage signal is induced into the sense line. At least during the fading away of the drive pulse $i_W$ a negative current has to flow through the bit line, which generates a magnetic field parallel to the easy axis and oriented towards the 1 position, so that under its influence the magnetization of the cell is fully reversed into the 1 state. Whenever the magnetization is reversed from the hard direction into the 1 state of the easy direction, again a positive voltage is induced into the sense line. As the read signal which occurs when writing a 1 is not needed, the sense amplifier can be "closed"; therefore, the read signal at instant $t_{n+1}$ in FIG. *5c* again is drawn in dotted lines.

The thin magnetic film memory described is "word organized," i.e. according to the address provided and held by the computer a respective word line is activated onto ready by the computer a respective word line is activated onto which is applied first ($t_1$) a readout clock pulse and thereafter, one clock time later ($t_2$), a write-in clock pulse. All the storage cells ("bits") belonging to said word at instant $t_1$ are sensed and the binary values contained therein are transmitted in parallel to the sense amplifiers via the sense lines. The binary values are written in at instant $t_2$ and that simultaneously into all the storage cells belonging to the respective word by means of correspondingly polarized currents in the bit lines (positive current→write-in 0; negative current pulse→write-in 1).

In the present storage arrangement the time sequential distance between readout and write-in clock pulses is 50 ns. (1 ns.$=10^{-9}$ s.) defining a repetition frequency (that is the sequence of two readout clock pulses, for instance) of 10 mc./s. The average pulse width of the clock pulses $i_W$ may be approximately 12 ns., with a pulse rise time and a pulse decay time of approximately 5 ns. each. Due to this kind of memory arrangement an amplitude for the drive pulse $i_W$ of less than 1 amp. is sufficient. Suitable values lie between 400 and 700 ma. The currents in the bit lines may be between 50 and 300 ma. A suitable value is 100 ma. The readout pulses provided in the sense lines have been found to be of a voltage value between 0.2 to 10 mv., which are readily amplified by reasonable means.

Incidentally, it is remarked that instead of using a positive current in the bit lines which produces a field in the preferred direction towards the 0 state, other measures also can be provided which serve the same purpose; for instance, the field in 0 preferred direction for all the cells of the storage arrangement in common can be produced by a Helmholtz coil arrangement or a permanent magnet. In these cases only at the instant when a 1 is to be written in negative write pulses are applied to the corresponding bit lines; during the rest of the time the bit lines are without current.

FIG. 6 illustrates the current distribution in a carrier substrate which is insulated from a ground plate by an insulation layer whenever a stripline-shaped current conductor is energized by a high frequency current pulse. FIG. 6 is employed as a vehicle to generally exemplify the principle of the current distribution; therefore, only the essential elements are shown, namely a metallic ground plate 41 comparable to the ground plate 1 of FIG. 2; a metallic carrier substrate 42 comparable to carrier substrate 2 of FIG. 2; an insulating layer 43 comparable to the layer 8 of FIG. 2 between the ground plate 41 and the substrate 42; a stripline-shaped current conductor 44 representing a word line 12 of FIG. 2, and the insulating layer 45 comparable to the layer 7 of FIG. 2 between carrier substrate 42 and current conductor 44. If a current pulse I is sent through the current conductor 44 and the ground plate 41, a current $I_k$ is induced into the carrier substrate by capacitive coupling, which current at least during the very first time of its existence is a closed surface current exclusively. This means that during this first time interval which approximately has a duration of a few nanoseconds between the current conductor 44 and the carrier substrate 42 under the assumption of a very good capacitive coupling, practically the same magnetic field is active as if the current pulse I would flow directly through the substrate. This phenomenon can also be interpreted such that the magnetic field assumes a disappearing small penetration depth into the inside of the carrier substrate. This penetration depth may be estimated. It is known in the pulse technique that for pulses with a rise time $T_A$ the bandwith B can be determined according to the formula of approximation $T_A \cdot B \approx 1/3$. If a rise time $T_A$ of approximately 3.3 ns. is assumed for the word line driving pulses, as this practically is the case in the embodiment described, according to the above formula a bandwidth B of approximately 100 mc./s. results. The penetration depth $\delta$, which shows at what distance from the surface the magnetic field has decayed to the $1/e^{th}$ part of the field density at the surface, can be calculated according to the known equation $$\delta = \sqrt{\frac{2}{\omega \mu_c \sigma}}$$

whereby: $\omega$=frequency; $\mu_0$=permeability (for the metallic carrier substrate $\mu_r=1$ has been assumed); $\sigma$=electrical conductivity. With the above-mentioned values for a carrier substrate of copper for instance, a penetration depth $\delta$=6, 7 $\mu$m. results, thus actually representing a disappearingly small value, so that at least during the first approximately 5 ns. of the action of the word line current pulse the current $I_k$ generated by capacitive coupling practically entirely flows on the immediate surface of the carrier substrate. The time interval of 5 ns. is absolutely sufficient to switch the magnetization of the respective storage cell, which is in the sphere of influence of the magnetic field being active between current conductor and carrier substrate, from the easy direction into the hard direction. As known, this reversal of the magnetization takes place by "rotational switching" of the magnetic dipoles of the magnetic film of the storage cell, i.e. practically without any delay with respect to the rise time of the drive pulse.

Figure 7A:
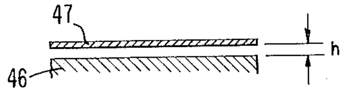
Figure 7B:
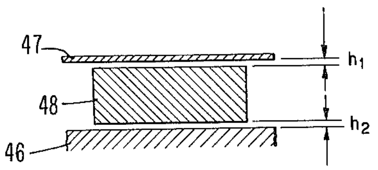

In order to obtain satisfactory operation of the storage arrangement it is essential to keep noise signals on the sense lines as small as possible. Such noise signals are first evoked by the word line driving pulses due to the capacitive coupling being present between word line and the sense line. In order to keep the noise signals small, the distance between word line 12 and carrier substrate 2 (see FIG. 2) is kept approximately five or more larger than the distance between sense line 11 and carrier substrate 2. Furthermore, the insulating layer 7 between the word lines 12 and the sense lines 11, is made of material exhibiting a smaller dielectric constant than the insulating layer 6 between the sense lines 11 and the storage cells 3 located on the carrier substrate 2. In order to economically construct the storage arrangement with respect to the periphery electronic circuits, wherein amplifiers are to be employed, the stripline-shaped current conductors are fabricated to have an impedance that is as small as possible. With reference to FIGS. 7*a*/*b* there is shown how the impedance of a stripline-shaped current conductor is influenced by placing a metallic substrate plate between the stripline-shaped current conductor and the ground plate carrying back current. FIG. 7*a* shows a metallic ground plate 46, above which is placed, at a distance $h$, the stripline-shaped current conductors 47. FIG. 7*b* again shows the metallic ground plate 46 and the stripline-shaped current conductor 47, between which is now provided a metallic substrate plate 48. The distance between the current conductor 47 and the substrate plate 48 is $h_1$ and the distance between the substrate plate 48 and the ground plate 46 is $h_2$. In the case where $h=h_1+h_2$, the impedance of the current conductor shown in FIG. 7*b* equals the impedance of the current conductor shown in FIG. 7*a*, i.e. the placement of the substrate plate 48 in between the ground plate 46 and the current conductor 47 does not increase the impedance of the stripline-shaped current conductor if the condition of distance $h=h_1+h_2$ is kept valid.

Small alterations in the stripline impedance become evident where two carrier substrates are placed near each other (see FIG. 1), in that very small inductances appear connected in series circuit relationship. On the whole no disturbances in the operation of the thin magnetic film memory occur owing to these small alterations on the impedance. In the practical embodiment the distance between two carrier substrates is kept as small as possible, one to two tenths of a millimeter, while the carrier substrates are insulated from each other whenever an insulating layer 4 is provided. In other to maintain the above mentioned condition of distance over the total length of the stripline-shaped current conductors, apart from the very substrate plates carrying the storage cells, additional metallic distance plates of approximately the same thickness as the carrier substrates can be provided which, at the respective places (arranged around the carrier substrates, for instance), join the carrier substrates at a small distance. Another contemplated mode of construction is where the carrier substrates are immersed so deep into the ground plate than an even surface is obtained for the stripline-shaped current conductors placed above.

With respect to the geometrical size of each carrier substrate, their size is such that for each magnetic storage cell deposited thereon during the applied process, the magnetic properties of each is kept as uniform as possible. It is of particular importance that the dispersion of the easy direction in the individual cells from the desired easy direction is small. The dispersion of the easy direction of the cells which are placed outwards toward the edge of the plate is naturally greater than the dispersion of the easy direction of the cells which are placed in the middle of the substrate. In the storage arrangement described comprising carrier substrates of the size of 5 x 5 cm. this dispersion of the easy direction is kept within ±3° per cell and therefor for each carrier with respect to the desired easy direction running parallel to the $x$-direction.

Let us shortly consider a modification in the construction of the three layers of stripline-shaped current conductors with respect to the storage cells each of which is placed on the carrier substrates. For the assemblage of the memory arrangement, the exact geometrical dimensions of the pattern of the stripline-shaped current conductors are first ascertained by measuring with the aid of a measuring microscope. These measurements serve for determining the final position of the coordinate points to fix the carrier subtrates onto the ground plate, and at these fixing points adjusting pins of insulating material are inserted into the ground plate. The carrier substrates are provided with two setting holes placed in diagonal, the diameters of the setting holes being exactly in conformity with the adjusting pins. Also the individual insulating layers, the bottom side of which carries the current conductors, are provided with flushly bearing setting holes into which fit the adjusting pins. The respective parts of the storage arrangement now are plied up one after the other and thereby at the same time fixed according to the previously ascertained measures relative to each other and with respect to the ground plate with the aid of the adjusting pins which are common for all the layers. The entire assembly is now pressed together and kept compact by screw joints for instance, as already described earlier (for instance, by means of a covering plate 10 which carries a crepe rubber intermediate layer 23, see FIG. 1).

Finally, it is pointed out that for the sake of clarity in the graphical representation the individual parts of the storage arrangement which are placed in different planes one above the other (e.g. insulating layers, stripline-shaped current conductors, covering plate, etc.) are depicted in an inadequate distance ratio in the FIGS. 2, 3 and 6. In the practical embodiment of the storage arrangement all these parts are tightly pressed one above the other.

While the storage arrangement according to the invention has been particularly shown and described with reference to a preferred embodiment thereof, it will be understood by those skilled in the are that various changes in form and detail may be made therein without departing from the spirit and scope of the invention as claimed hereafter.

What is claimed is:

1. A magnetic memory structure comprising:
a plurality of planar, current conductive, carrier substrate members each having a matrix of individual anisotropic magnetic thin film elements on one surface thereof arranged in columns and rows with an easy axis of magnetization exhibited by each element being parallel to one another;
a planar, current conductive, support member having a continuous coating of insulating material on one surface thereof;
said plurality of carrier substrate members having their opposite surface affixed to the insulated surface of said support member and arranged such that a column of magnetic elements of one carrier substrate is in alignment with a similar column of magnetic elements of one adjacent carrier substrate member and, a row of magnetic elements of said one carrier substrate member is in alignment with a similar row of magnetic elements of another adjacent substrate member with the easy axis of one element of said one carrier substrate member being parallel to the easy axis of any other element on adjacent carrier substrate members;
a plurality of groups of stripline-shaped conductors comprising:
a group of column input conductors,
a group of row input conductors, and
a group of row output conductors;
each conductor of said groups of conductors having one end ohmically connected to said support member and coordinately traversing the magnetic elements on said carrier substrate members;
said magnetic elements on said carrier substrate members having a first continuous layer of insulating material thereon;

said group of row output conductors positioned on the surface of said first insulating layer and having a second continuous layer of insulating material thereon;
said group of column input conductors positioned on the surface of said second insulating material and having a third continuous layer of insulating material thereon; and
said group of row input conductors positioned on the surface of said surface of said third layer of insulating material.

2. The memory as set forth in claim 1, wherein the dielectric constant exhibited by the material of said first layer of insulating material onto which said group of output conductors are positioned is greater than the dielectric constant exhibited by the material of said second layer of insulating material onto which said group of column output conductors are positioned.

3. The memory as set forth in claim 2, wherein the ratio thickness of said first layer of insulating material and the second layer of insulating material adjacent said group of output conductors is approximately one to five.

4. The memory as set forth in claim 3, wherein each respective conductor of said group of column input conductors couples each magnetic element of said carrier substrate members in a similar column in alignment with the easy axis of the respective magnetic elements and each respective conductor of said group of row input conductors couples each magnetic element of said carrier substrates in a similar row, transverse with respect to the easy axis of the respective magnetic elements.

5. A magnetic memory structure comprising:
a plurality of planar, current conductive, carrier substrate members each having a matrix of individual anisotropic magnetic thin film elements on one surface thereof arranged in columns and rows with an easy axis of magnetization exhibited by each element being parallel to one another;
a planar, current conductive, support member having a continuous coating of insulating material on one surface thereof;
said plurality of carrier substrate members having their opposite surface affixed to the insulated surface of said support member and arranged such that a column of magnetic elements of one carrier substrate is in alignment with a similar column of magnetic elements of one adjacent carrier substrate member and, a row of magnetic elements of said one carrier substrate member is in alignment with a similar row of magnetic elements of another adjacent substrate member with the easy axis of one element of said one carrier substrate member being parallel to the easy axis of any other element in adjacent carrier substrate members;
a plurality of groups of stripline-shaped conductors comprising:
a group of column input conductors,
a group of row input conductors, and
a group of row output conductors;
each conductor of said plurality of groups of conductors having one end ohmically connected to said support member; and
said group of output conductors, said group of column input conductors and said group of row input conductors coordinately traversing the magnetic elements on said carrier substrates and respectively positioned one over the other, intermediate layers of insulating material, on the one surface of said carrier substrate members.

6. A magnetic memory structure comprising:
a plurality of planar, current conductive, carrier substrate members each having a matrix of individual anisotropic magnetic thin film elements one surface thereof arranged in columns and rows with an easy axis of magnetization exhibited by each element being parallel to one another;

a planar, current conductive, support member having a continuous coating of insulating material on one surface thereof;

said plurality of carrier substrate members having their opposite surface affixed to the insulated surface of said support member and arranged such that a column of magnetic elements of one carrier substrate is in alignment with a similar column of magnetic elements of one adjacent carrier substrate member and, a row of magnetic elements of said one carrier substrate member is in alignment with a similar row of magnetic elements of another adjacent substrate member with the easy axis of one element of said one carrier substrate member being parallel to the easy axis of any other element in adjacent carrier substrate members;

a plurality of groups of stripline-shaped conductors comprising:

a group of column input conductors,
a group of row input conductors, and
a group of row output conductors;

each conductor of said plurality of groups of conductors having one end ohmically connected to said support member;

said groups of conductors coordinately traversing the magnetic elements on said carrier substrates with each group positioned one over the other, intermediate layers of insulating material, on the one surface of said carrier substrate members.

7. A magnetic memory structure comprising:

a plurality of planar, current conductive, carrier substrate members each having a matrix of individual anisotropic magnetic thin film elements on one surface thereof arranged in columns and rows with an easy axis of magnetization exhibited by each element being parallel to one another;

a planar, current conductive, support member having a continuous coating of insulating material on one surface thereof;

said plurality of carrier substrate members having their opposite surface affixed to the insulated surface of said support member and arranged such that a column of magnetic elements of one carrier substrate is in alignment with a similar column of magnetic elements of one adjacent carrier substrate member and, a row of magnetic elements of said one carrier substrate member is in alignment with a similar row of magnetic elements of another adjacent substrate member with the easy axis of one element of said one carrier substrate member being parallel to the easy axis of any other element in adjacent carrier substrate members;

a plurality of groups of stripline-shaped conductors;

each conductor of said plurality of groups of conductors having one end ohmically connected to said support member; and said groups of conductors coordinately traversing the magnetic elements on said carrier substrate members with each group positioned one over the other, intermediate layers of insulating material, on the one surface of said carrier substrate members.

8. A magnetic memory structure comprising:

a plurality of planar, current conductive, carrier substrate members each having a matrix of individual anisotropic magnetic thin film elements on one surface thereof arranged in columns and rows with an easy axis of magnetization exhibited by each element being parallel to one another;

a planar, current conductive, support member having a continuous layer of insulating material on one surface thereof;

said plurality of carrier substrate members affixed to the insulated surface of said support member and arranged such that a column of magnetic elements of one carrier substrate member is in substantial alignment with a similar column of magnetic elements in the remaining of said carrier substrate members with the easy axis of one element of said one carrier substrate member being parallel with the easy axis of another element of the remaining carrier substrate members;

a plurality of groups of stripline-shaped conductors;

each conductor of said plurality of groups of conductors having one end ohmically connected to said support member; and said groups of conductors coordinately traversing the magnetic elements on said carrier substrate members with each group positioned one over the other, intermediate layers of insulating material, on the one surface of said carrier substrate members.

9. A magnetic memory structure comprising:

a plurality of planar, current conductive, carrier substrate members each having a matrix of individual anisotropic magnetic thin film elements on one surface thereof with an easy axis of magnetization exhibited by each said element being parallel to the easy axis of the remaining elements;

a planar, current conductive, support member having a continuous layer of insulating material on one surface thereof;

said carrier substrate members having their opposite surface affixed to the insulated surface of said support member with the easy axes of the magnetic elements on one carrier substrate member being parallel to the easy axes of the magnetic elements on the remaining carrier substrate members;

a plurality of groups of conductors traversing the magnetic elements on said carrier substrate members;

each conductor of said plurality of groups of conductors having one end ohmically connected to said support member; and said groups of conductors being positioned one over the other, intermediate layers of insulating material, on the one surface of said carrier substrate members.

10. A magnetic memory structure comprising:

a plurality of planar, current conductive, carrier substrate members each having a matrix of individual anisotropic magnetic thin film elements on one surface thereof with an easy axis of magnetization exhibited by each element being parallel to the easy axis of the remaining elements;

a planar, current conductive, support member having a continuous layer of insulating material on one surface thereof;

said carrier substrate members having their opposite surface affixed to the insulated surface of said support member with the easy axes of the magnetic elements of one carrier substrate member being parallel to the easy axes of the magnetic elements of the remaining carrier substrate members; and a plurality of groups of conductors traversing the magnetic elements on said carrier substrate members with each conductor of each group having one end ohmically connected to said support member.

11. A magnetic memory structure comprising:

a planar, current conductive, carrier substrate member having a plurality of individual anisotropic magnetic thin film elements on one surface thereof with each element exhibiting an easy axis of magnetization parallel with respect to one another;

a planar, current conductive, support member having a continuous layer of insulating material on one surface thereof;

said carrier substrate member having its opposite surface affixed to the insulated surface of said support member;

a plurality of groups of conductors traversing the magnetic elements on said carrier substrate member;
each conductor of said plurality of groups of conductors having one end ohmically connected to said support member; and
said groups of conductors being positioned one over the other, intermediate layers of insulating material, on the one surface of said carrier substrate members.

12. A magnetic memory structure comprising:
a planar, current conductive, carrier substrate member having a plurality of individual anisotropic magnetic thin film elements on one surface thereof with each element exhibiting an easy axis of magnetization parallel with respect to one another;
a planar, current conductive, support member having a continuous layer of insulating material on one surface thereof;
said carrier substrate member having its opposite surface affixed to the insulated surface of said support member; and
a plurality of groups of conductors traversing the magnetic elements on said carrier substrate member with each conductor of each group having one end ohmically connected to said support member.

13. A magnetic memory structure comprising:
a planar, current conductive, carrier substrate member having a plurality of individual anisotropic magnetic thin films on one surface thereof coordinately arranged in columns and rows with an easy axis of magnetization exhibited by each element being parallel to one another;
a planar, current conductive, support member having a continuous layer of insulating material on one surface thereof;
said carrier substrate member having its opposite surface affixed to the insulated surface of said support member;
a plurality of groups of conductors coordinately traversing said magnetic elements with each conductor of each group having one end ohmically connected to said support member.

14. A magnetic memory structure comprising:
a planar, current conductive, support member,
a planar, current conductive, carrier substrate member affixed to said support member and having a plurality of anisotropic magnetic thin film elements on one surface thereof coordinately arranged in columns and rows with an easy axis of magnetization exhibited by each element being parallel with one another; and
a plurality of groups of conductors coordinately traversing said magnetic elements with each conductor of each group having one end ohmically connected to said support member.

No references cited.

IRVING L. SRAGOW, *Primary Examiner.*

G. LIEBERSTEIN, *Assistant Examiner.*